(No Model.)
R. B. MORSE.
STEAM TRAP.
No. 298,878.  Patented May 20, 1884.
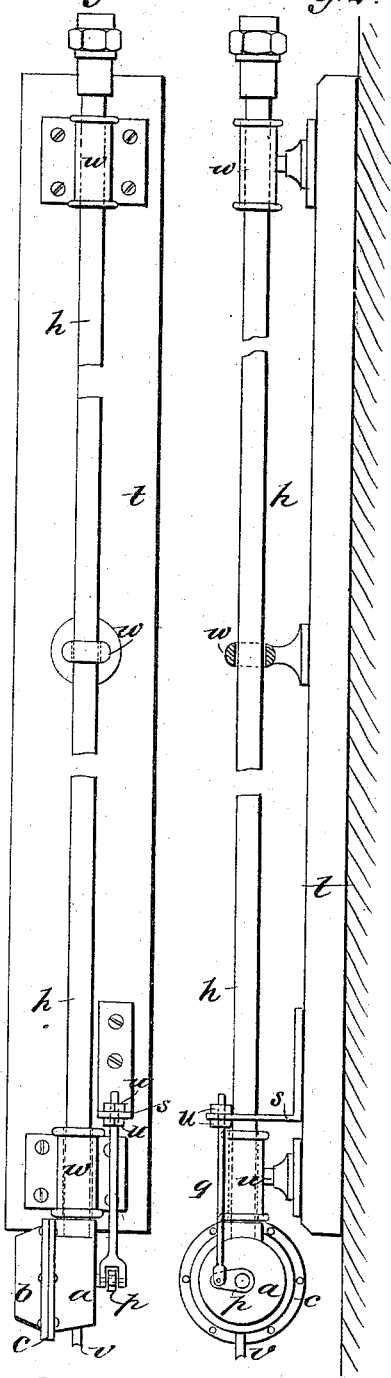
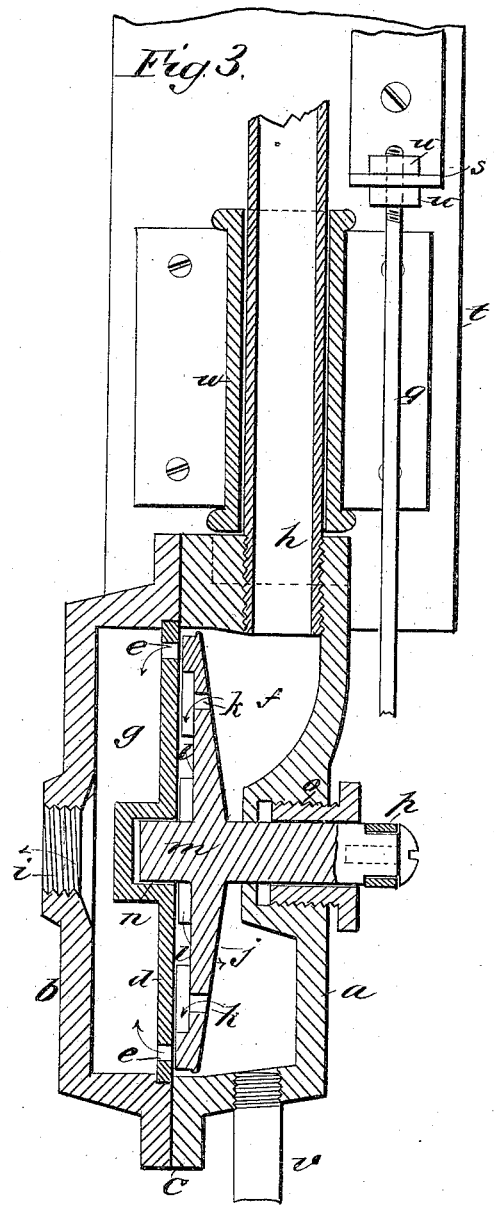
WITNESSES:
Francis McArdle
C. Sedgwick
INVENTOR:
R. B. Morse
BY Munn & Co.
ATTORNEYS.
N. PETERS, Photo-Lithographer, Washington, D. C.

UNITED STATES PATENT OFFICE.

ROBERT B. MORSE, OF NAUGATUCK, CONNECTICUT.

STEAM-TRAP.

SPECIFICATION forming part of Letters Patent No. 298,878, dated May 20, 1884.

Application filed December 14, 1883. (No model.)

*To all whom it may concern:*

Be it known that I, ROBERT B. MORSE, of Naugatuck, in the county of New Haven and State of Connecticut, have invented a new and Improved Steam-Trap, of which the following is a full, clear, and exact description.

My invention consists of a circular or disk valve arranged on an axial stem at right angles to the length of a steam-pipe, on the end of which the valve-case is attached, which stem extends out of the valve-case through a stuffing-box and has a crank-arm also projecting at right angles to the steam-pipe, and being connected by a short rod to a bracket, so as to be firmly held while the steam-pipe expands and contracts by the heat and cold, and thus causes the valve to turn for opening and closing the ports for the escape of water condensing in the trap, making a simple, efficient, and reliable trap for steam-heating apparatus and the like, all as hereinafter fully described.

Reference is to be had to the accompanying drawings, forming part of this specification, in which similar letters of reference indicate corresponding parts in all the figures.

Figure 1 is a front elevation of my improved trap. Fig. 2 is a side elevation with one of the pipe-holding brackets in section, and Fig. 3 is a sectional elevation of the trap on an enlarged scale.

I make a valve-case of two circular cup-shaped plates, $a$ $b$, with flanges $c$ for bolting them together, and containing a circular seat, $d$, having ports $e$ for the escape of the water condensing in pipe $h$ and chamber $f$ from said chamber into chamber $g$, from which it flows away through a pipe connected at $i$. In the chamber $f$, I fit a disk-valve, $j$, on the valve-seat $d$, the valve having ports $k$ through it and chambers $l$ in the face for the escape of water when chambers $l$ are opened to the ports $e$ of seat $d$, which is effected by the turning of the valve. The valve $j$ has a stem, $m$, that is centered in a socket, $n$, of the valve-seat, and also in a stuffing-box, $o$, through which said stem extends out of part $a$ of the case to connect with a crank-arm, $p$, from which a rod, $q$, extends along the pipe $h$ a short distance and connects with a bracket, $s$, attached to the wall-plate $t$, so as to be held rigidly to shift the valve when the pipe $h$, to which the valve case is attached, expands and contracts, and thereby shifts the valve-case, so as to cause the valve to open the ports $e$ to allow the water to escape and to close them to prevent the escape of steam after the water has been discharged. When the water flows out and allows steam to descend in the pipe $h$, the heat of the steam will expand the pipe and close the valve, and when the valve closes the steam condenses and cools and contracts the pipe, so as to open the valve. The valve-rod $q$ is connected to the bracket $s$ by adjusting-nuts $u$, enabling the valve to be adjusted for setting it, as required, for opening and closing.

The part $a$ of the valve-case has a waste-pipe, $v$, attached to it, in which pipe a cock will be fitted in practice for blowing out the sediment from time to time that collects in the chamber $f$.

The pipe $h$ is mounted in supporting-brackets $w$ suitably for sliding in them as it shifts by expansion and contraction, said pipe $h$ being attached to the discharge-pipe of a heating-coil.

Having thus described my invention, I claim as new and desire to secure by Letters Patent—

1. The valve-case containing a disk-valve attached to the end of the steam-pipe $h$, and said valve having a crank-arm, $p$, outside of the case, connected to a fixed support, and causing the valve to turn for opening and closing the ports by the shifting of the case by the expansion and contraction of the pipe, substantially as described.

2. The valve-case consisting of two parts, $a$ $b$, and having a circular valve-seat, $d$, and containing the disk-valve $j$ centered in said valve-seat and in the stuffing-box, and connected by a crank-shaft or equivalent connection to a fixed support, said valve-case having chamber $f$ connected to the steam-pipe $h$, and also having chamber $g$ with a waste-pipe connection, $i$, substantially as described.

3. The improved steam-trap, consisting of case $a$ $b$, containing a disk-valve, $j$, attached to the end of the steam-pipe $h$, said valve having a stem, $m$, extending out through the valve-case at right angles to the pipe $h$, and said stem having a crank-arm also extending at right angles to the steam-pipe, and connected to a fixed object, substantially as described.

ROBERT B. MORSE.

Witnesses:
 ALBERT HAWLEY,
 ISAAC A. MORSE.